April 21, 1970  C. A. ALFSEN  3,507,557
OPTICAL READOUT ASSEMBLY
Filed Oct. 10, 1967  2 Sheets-Sheet 2
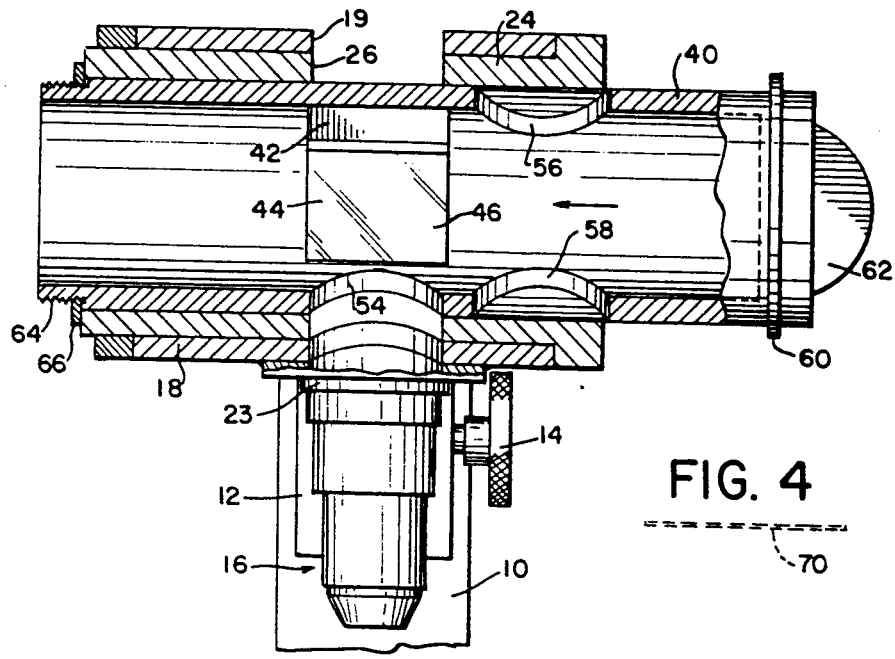
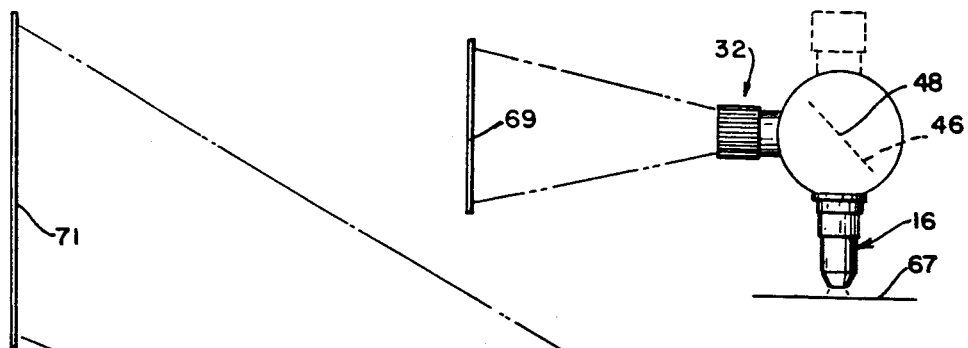
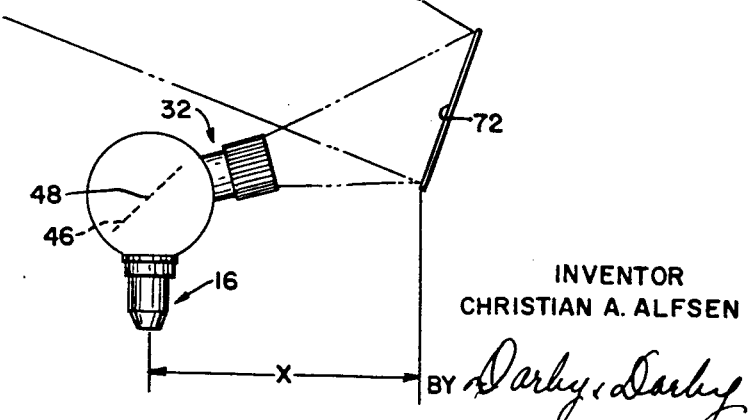
INVENTOR
CHRISTIAN A. ALFSEN
BY Darby & Darby
ATTORNEYS

United States Patent Office

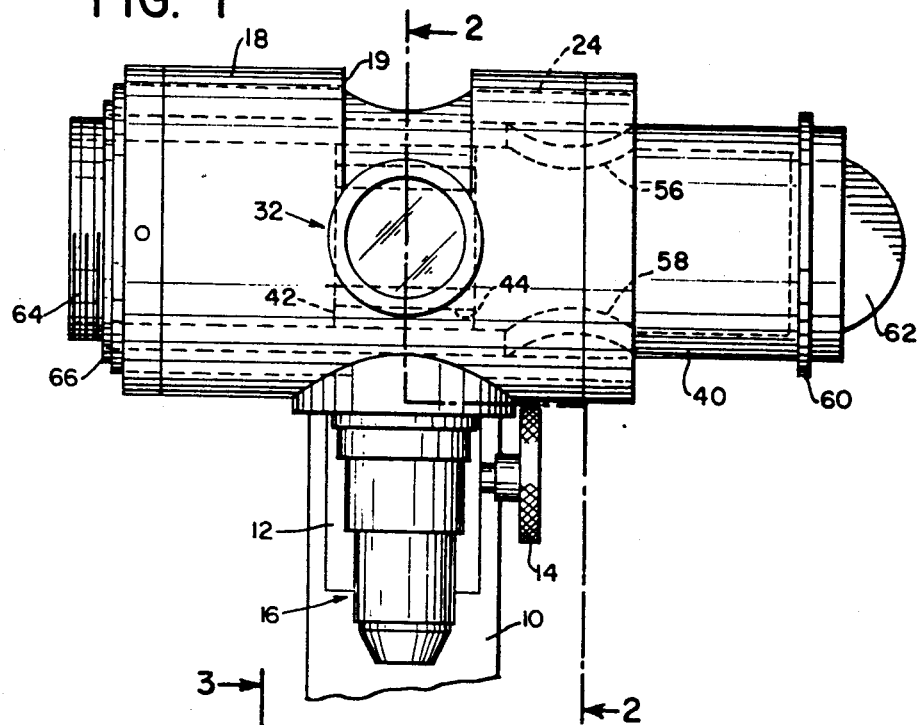
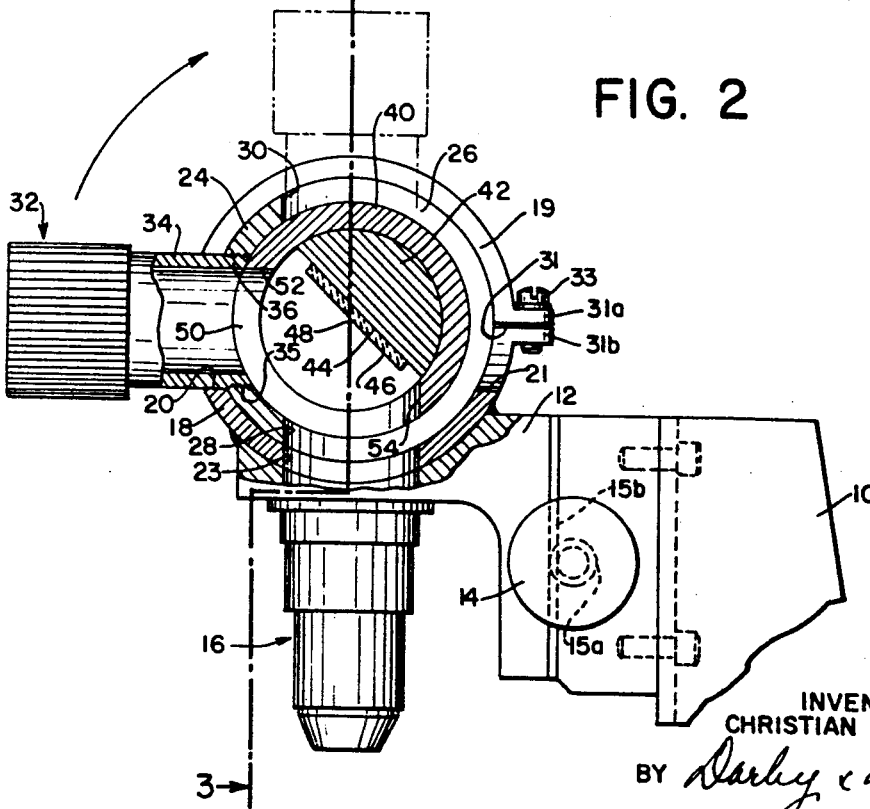

3,507,557
Patented Apr. 21, 1970

3,507,557
OPTICAL READOUT ASSEMBLY
Christian A. Alfsen, East Northport, N.Y., assignor, by mesne assignments, to Microform Data Systems, Inc., a corporation of Delaware
Filed Oct. 10, 1967, Ser. No. 674,202
Int. Cl. G02b 17/00
U.S. Cl. 350—202         4 Claims

ABSTRACT OF THE DISCLOSURE

An optical readout assembly for use with a microimage viewer comprises a projection lens assembly which is rotatable 180° with respect to the microscope lens, and a rotatable mirror disposed so that the axis of rotation of the projection lens assembly lies in the plane of the reflective surface of the mirror whereby a selected microimage can be magnified and projected over a wide angular range. The mirror is rotatable within a trunnion so that the image transmitted through the microscope lens may be reflected to the projection lens when it is in either a forward or rearward position. The mirror may be axially removed from the trunnion to permit a hard copy reproduction of a selected microimage on a copying machine positioned directly above the microscope lens when the projection lens assembly is rotated into an upward position.

---

The present invention relates to an optical readout assembly for use with microfilm or microimage viewers wherein a selected image is projected onto a rear view projection screen or onto the sensitized paper of a copying machine situated above and generally perpendicular to the screen.

U.S. patent application Ser. No. 472,498, filed on July 16, 1965, now Patent No. 3,361,031, and assigned to the assignee of this application, relates to a microimage viewer in which a plurality of microimages (e.g., about ten thousand) are arranged in a matrix, the matrix being movable with respect to an optical readout assembly whereby any selected one of the microimages may be automatically positioned beneath the readout assembly to be magnified and projected onto a rear view screen for readout. In the use of this specific microimage viewer and other related devices, it is often desirable to be able to make a hard copy of the selected microimage, for which purpose it is necessary to magnify the selected microimage directly onto the sensitized paper of a standard copying machine. For practical purposes, it is convenient to situate the copying machine on top of the microimage viewer such that the sensitizer paper lies in a horizontal plane, i.e., generally perpendicular to the readout screen.

The present invention provides an optical readout assembly for use with a microfilm or microimage viewer, which can project a selected image horizontally onto a rear view screen or vertically onto the sensitized paper of a copying machine for reproduction purposes.

An important benefit of the invention also resides in its adaptability for use with a wide variety of different viewers. Since even a single manufacturer may produce a wide variety of different viewers in which the output screens are positioned at different angles with respect to a projection lens assembly, it has previously been necessary to fabricate different readout assemblies in each such case. However, the readout assembly according to the invention can be used with virtually any viewer regardless of the orientation between the screen and projection lens. Because of the wide range of projection angles provided by the invention, it may be used as a means for increasing the length of the projection path between the magnified microimage and rear view screen thus increasing the size of the projected image.

Briefly, in accordance with the invention, a projection lens assembly and mirror are rotatably mounted in a trunnion which is maintained stationary with respect to the lens which magnifies the selected image. The reflective surface of the mirror lies on the axis of rotation of the projection lens assembly whereby a single optical readout assembly can be used with a variety of different viewers in which it may be desired to project a selected image at different angles in both the forward and rearward directions. When it is desired to produce hard copies, the projection lens may be rotated to a vertical position and the mirror axially removed from the trunnion so that the magnified image can be projected directly onto the sensitized paper of a hard-copy machine situated above the viewer.

In the drawings:
FIGURE 1 is a front view of the optical readout assembly according to the invention;
FIGURE 2 is a side view partially in section along the line 2—2 of FIGURE 1;
FIGURE 3 is a front view partially in section along the line 3—3 of FIGURE 2;
FIGURE 4 is a diagrammatic illustration of the operation of the invention; and
FIGURE 5 is a diagrammatic illustration showing how the invention could be used to increase the length of the projection path.

The preferred embodiment of the invention is intended specifically for use with the type of microimage viewer disclosed in the aforementioned patent application No. 472,498. Although, obviously, the invention is not necessarily so limited, the following description should be interpreted with reference to that application to the extent an understanding of the environment is necessary to an appreciation of the invention.

Referring now to the drawings, an optical readout assembly is shown supported on a bridge 10 with respect to which an L-shaped mounting plate 12 is movable in a vertical direction when a focus knob 14 is manually turned. In an obvious and well-known fashion, focus knob 14 is coupled to a pinion 15a which engages a rack 15b connected to the rear of plate 12 to cause a magnification lens assembly 16 to move vertically so as to focus the projected image.

The magnification lens 16 may be mounted in any standard fashion on the mounting plate 12. Since the construction of the assembly 16 is well known and forms no part of the present invention, it is only shown in outline form in the drawings. In fact, the entire construction described to this point is standard and in itself forms no part of the present invention.

According to the invention, a cylindrical trunnion 18 is mounted as by welding on the top of the mounting plate 12. Trunnion 18 includes a circumferential slot 19 which extends for more than 180° in alignment with the magnification lens 16, and defined at its extremities by trunnion edges 20 and 21 (see FIG. 2). A trunnion aperture 23 is provided in alignment with the magnification lens assembly 16.

An elongated sleeve 24 is mounted for rotation within the trunnion 18 but in a tightly fitting relationship. The sleeve 24 also includes a circumferential slot 26 which extends for more than 180° between the sleeve edges 28 and 30 (see FIG. 2). In the illustrated position, the portion of the slot 26 bounded by edge 28 is in alignment with the trunnion aperture 23 and magnification lens 16. A portion of the trunnion 18 may be split as shown at 31 and the opposing flanges 31a and 31b formed in an obvious fashion for the purpose of clamping the sleeve 24 in a fixed position by means of a tightening screw 33.

A standard projection lens assembly 32 includes a cylindrical casing 34 which passes through the slot 19 in trunnion 18 and is threaded at its free extremity 35 and screwed into a suitable projection aperture 36 within the sleeve 24.

Mounted within the sleeve 24, and extending axially therefrom, is a cylinder 40 in which a short, solid semicylindrical mounting block 42 is secured. A "first surface" mirror 44 is soldered or otherwise mounted on block 42 so that the reflecting surface 46 of the mirror lies on the axis of rotation 48 of the entire projection assembly 32. The cylinder 40 should fit snugly within sleeve 24 but must be rotatable and axially movable with respect thereto. Cylinder 40 includes an elongated circumferential slot 50 which is defined by the extremities 52 and 54. Additionally, two oppositely disposed circular apertures 56 and 58, axially displaced from slot 50 (FIG. 4), are formed in cylinder 40. An integral flange 60 at one end of the cylinder 40 serves as a stop member for purposes explained below, and a handle 62 at the same end permits manual positioning of the cylinder within the trunnion 18. The other end of the cylinder 40 is threaded at 64 and an annular member 66 is screwed thereon to serve as a stop member against sleeve 24 for purposes which are also described in greater detail below.

In the position illustrated in FIGURES 1-3, the projection device corresponds to that shown diagrammatically in FIGURE 4. Thus, referring to FIGURE 4, the magnification lens assembly 16 magnifies a selected microimage on a microimage storage medium 67. The magnified image is reflected by mirror 44 to the projection lens 32, and thus projected against a rear projection screen 69 so that a viewer on the other side of screen 69 can read the selected microimage. In accordance with the invention, it is also possible to use the same optical readout assembly for the purpose of reproducing a hard copy of a preselected image. Thus, a sheet of sensitized paper 70 is diagrammatically shown in dotted lines in FIGURE 4. As now explained, the invention can be used to project the selected microimage directly onto paper 70 so that a hard copy of the selected microimage can be produced.

Because of the nature of the copying machine it is necessary that the inverse of the image projected against screen 69 be projected onto the sensitized paper 70. Thus, the projection lens assembly 32 and its mounting sleeve 24 are first rotated within the trunnion slot 19 into the dotted line position shown in FIGURES 2 and 4. The user then pushes the mirror mounting cylinder from right to left (as viewed in FIGS. 1 and 3) until the flange 60 abuts against the right-hand end of sleeve 24. This removes the mirror 44 from the optical path between the magnification lens 16 and projection lens 32 thereby "inverting" the image output. The user then rotates the cylinder 40, so that the apertures 56 and 58 are directly aligned in a vertical path between the magnification lens assembly 16 and projection lens assembly 32. Although not illustrated, numerous standard indexing and/or securing means (e.g., set screws) may be employed to position and hold the illustrated parts with respect to each other. Of course, any desired corrective lens arrangement (not shown) can be arranged in the optical path to provide a suitably oriented image and whatever focusing (if any) which may be required for copying purposes.

An additional advantage of the invention is the fact that it can be employed in a viewer in such a fashion as to substantially increase the size of the projected image by lengthening the projection path. Thus, referring to FIGURE 5, an enlarged screen 71 is shown with the projection lens assembly 32 positioned in a generally rearward direction somewhat less than 180° from the assembly position shown in FIGURE 4. A mirror 72 is suitably positioned to reflect the projected image from the lens assembly 32 onto the enlarged screen 71. When the image is projected in this fashion, the length of the projection path is increased by a distance approximately equal to twice the distance between the magnification lens 16 and mirror 72, shown as X in FIG. 5.

From the preceding description, the arrangement of the respective parts in accordance with FIGURE 5 should be apparent. Briefly, the lens assembly 32 is rotated to the desired position where it may be held in any suitable manner. The mirror mounting cylinder 40 is pulled to the right so that the annular ring 66 abuts against the left-hand edge of sleeve 24. By turning the handle 62, the cylinder 40 and mirror 44 are positioned so that the mirror 44 is slightly more than 90° counterclockwise from its position shown in FIGURE 2, and suitably oriented to reflect the output of magnification lens 16 through the projection lens 32. In this case also, the relative position of the parts may be indexed and locked in any desired fashion.

The length of the slots 26 and 50 in the sleeve 24 and cylinder 40 may be such that a single optical readout assembly can be used in different viewers where it may be desired to project over a range of angles within acceptable distortion limits. Where used with the microimage viewer of application No. 472,498, it would only be necessary to adjust the projection lens 32 between one horizontal and one vertical readout position, although the invention could be used as an adjustable device within a particular viewer if, for example, it were desired to adjust the screen 69 at different angles with respect to the projector lens assembly position illustrated in FIG. 4.

Various modifications will be obvious to those skilled in the art. For example, in place of the illustrated slots (except for slot 19) properly positioned apertures may serve the same function in the same way, and vice versa. The material used for the various parts is not a critical consideration, although, preferably, brass is used for the movable parts. Also, the invention is not limited to use with viewers in conjunction with copying machines whether placed above or elsewhere with respect to the viewer. Moreover, the principles of the invention may be employed with front view as well as rear view projection systems. Accordingly, the invention should be defined by the following claims.

What is claimed is:

1. An optical readout assembly for use in magnifying and projecting an image in at least two different directions, comprising a magnification lens assembly having an optical axis, a trunnion positioned above said magnification lens assembly and immovable with respect thereto, said trunnion including a circumferential slot extending over an arc substantially greater than 90 degrees, said trunnion further defining a longitudinal axis intersected by and perpendicular to said magnification lens assembly optical axis, a sleeve movably mounted in said trunnion for rotation about the trunnion axis, the trunnion including first aperture means and a projection aperture arranged radially with respect to the trunnion axis, a projection lens assembly positioned radially with respect to said trunnion axis and extending through said trunnion slot and secured to said sleeve in alignment with said projection aperture, said projection lens assembly being rotatable within said trunnion slot through an arc greater than 90 degrees and into direct physical alignment with said magnification lens assembly, a mounting cylinder disposed within said sleeve and rotatably movable about and axially movable along said trunnion independently of the projection lens assembly, the cylinder having second aperture means for transmitting light from said magnification lens assembly to said projection lens assembly, and a mirror secured within said mounting cylinder for optically aligning the optical axes of the magnification lens assembly and the projection lens assembly through said second aperture means, a reflective surface of said mirror lying on said trunnion axis, said mirror being removable from said optical path by axial movement of said cylinder along said trunnion axis.

2. An optical readout assembly according to claim 1, wherein said cylinder further includes third aperture means axially displaced from said first aperture means for permitting the straight line passage of light through said cylinder, said cylinder being axially movable a sufficient distance to selectively align said first aperture means or said third aperture means with said magnification lens assembly.

3. An optical readout assembly according to claim 2, wherein said first aperture means comprises an elongated circumferential slot.

4. An optical readout assembly according to claim 2, including stop means for aligning either said second or third aperture means with said magnification lens assembly.

References Cited

UNITED STATES PATENTS

| | | | |
|---|---|---|---|
| 1,958,280 | 5/1934 | Patterson | 350—34 XR |
| 2,453,257 | 11/1948 | Ott | 350—202 |

DAVID SCHONBERG, Primary Examiner

M. J. TOKAR, Assistant Examiner